No. 860,316. PATENTED JULY 16, 1907.
L. P. NASH.
CASING FOR SIPHON BOTTLES.
APPLICATION FILED MAR. 18, 1907.
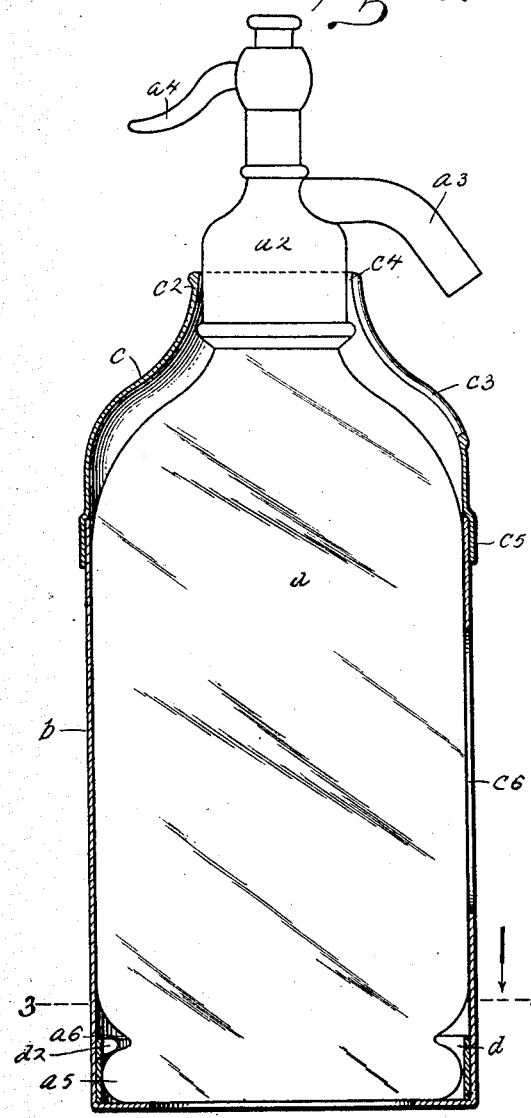
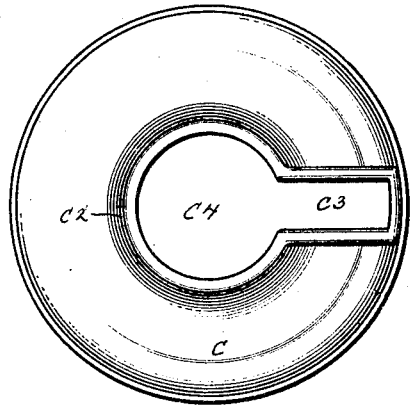
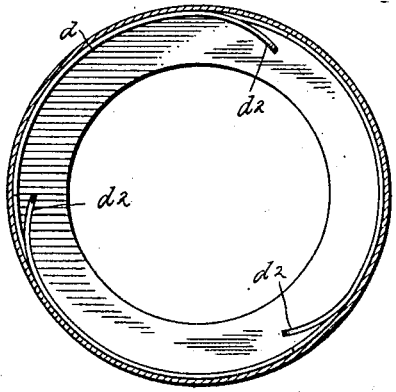
WITNESSES
INVENTOR
Louis P. Nash
BY
ATTORNEYS.

UNITED STATES PATENT OFFICE.

LOUIS P. NASH, OF NEW YORK, N. Y.

CASING FOR SIPHON-BOTTLES.

No. 860,316.　　　Specification of Letters Patent.　　　Patented July 16, 1907.

Application filed March 18, 1907. Serial No. 362,863.

*To all whom it may concern:*

Be it known that I, LOUIS P. NASH, a citizen of the United States, residing at New York, in the county of New York and State of New York, have invented certain new and useful Improvements in Casings for Siphon-Bottles, of which the following is a specification, such as will enable those skilled in the art to which it appertains to make and use the same.

This invention relates to siphon bottles, such as seltzer bottles and other bottles designed for containing effervescent liquids, and the object thereof is to provide a bottle or vessel of this class with a casing of novel construction and by means of which the entire body portion of the bottle or vessel is inclosed up to and including the bottom portion of the neck.

The invention is fully disclosed in the following specification, of which the accompanying drawing forms a part, in which the separate parts of my improvement are designated by suitable reference characters in each of the views, and in which:—

Figure 1 is a side view of an ordinary siphon bottle and showing my improved casing in section; Fig. 2 a plan view of the top portion of the casing detached from the body or bottom portion thereof; and, Fig. 3 a section of the casing on the line 3—3 of Fig. 1.

In the drawing forming part of this specification, I have shown at $a$ an ordinary siphon bottle provided with the usual metallic neck portion $a^2$ at one side of which is the usual discharge spout $a^3$, above which and at the opposite side of the neck is the usual operating lever $a^4$ by means of which the valve in the neck, not shown, is operated so as to permit of the discharge of the contents of the siphon or siphon bottle through the spout $a^3$.
In the practice of my invention, I provide a casing comprising a bottom portion $b$ and top portion $c$. The bottom portion $b$ of the casing is of the same form in cross section as the bottom or body portion of the siphon and extends upwardly far enough to inclose the body portion of the siphon up to the point where said body portion curves into the neck portion and the top part $c$ of the casing is substantially conical in form, or is inclined inwardly and upwardly so that the top $c^2$ thereof will substantially fit the part $a^2$ of the neck of the siphon, and in one side of the top part $c$ of the casing is a radial slot or opening $c^3$ which communicates with the central opening $c^4$ therein. The bottom portion of the part $c$ of the casing of the siphon is provided with an enlarged flange $c^5$ which is adapted to closely fit the top of the body portion of the casing as shown in Fig. 1, and to be held thereon by friction, but the top part $c$ of the casing may be detachably connected with the bottom part $b$ thereof in any desired manner.

Within the bottom of the bottom part $b$ of the casing is secured an annular band $d$, in the form of construction shown, and said annular band is provided with a plurality of inwardly directed spring fingers $d^2$, three of which are shown in Fig. 3 and one in Fig. 1, and the bottom of the siphon, as is usually the case with vessels of this class, is provided with a deep annular bead $a^5$ above which is a deep annular groove $a^6$.

In practice, the top part or portion $c$ of the casing is detached from the bottom part thereof and the siphon is inserted into the bottom portion of said casing, and in this operation the spring fingers $d^2$ are forced outwardly and then sprung inwardly into the annular groove $a^6$. The top part $c$ is then passed downwardly over the neck portion of the siphon and connected with the bottom portion of the casing, and in this operation the top part $c$ of the casing is held so that the lever $a^4$ will pass through the radial slot or opening $c^3$, after which said top part $c$ of the casing is turned so that the discharge spout $a^3$ will pass through said slot or opening, and in detaching the casing from the siphon, this operation is reversed or the top part $c$ is raised so that the discharge spout will first pass through the slot or opening $c^3$, after which said top part $c$ of the casing is turned so that the lever $a^4$ will pass through said slot or opening.

The object of the band $b$ and spring fingers $d^2$ is to permit the siphon with the casing thereon to be carried by means of the neck thereof, if the top part $c$ of the casing is connected with the bottom part $d$ only by a slip-joint as shown.

It will be understood that the casing of the siphon may be ornamented, if desired, to any extent or in any manner and one or more sides thereof may be provided with a vertically arranged slot or opening $c^6$ through which the contents of the siphon may be seen.

The bottom portion $b$ of the casing may, if desired, be used, in some cases without the top portion $c$ and may also be used on bottles which are not made into siphons, and in this event the springs $d^2$ will hold the casing on the bottle under ordinary circumstances but said casing may be removed from the bottle by pulling thereon, and it will be apparent that the bottom portion $b$ of the casing may also be used on a siphon as shown in Fig. 1 of the drawing, if desired, without the top portion $c$, and in this event the springs $d^2$ will hold the casing on the bottom portion of the siphon while the latter is being carried by the neck thereof.

Having fully described my invention, what I claim as new and desire to secure by Letters Patent, is:—

1. A siphon casing comprising a bottom portion and a top portion detachably connected therewith, the top portion being inwardly contracted at the top to form a central opening adapted to receive the neck of the siphon, said top portion being also provided in one side with a radial slot or opening which communicates with said central opening.

2. A siphon casing, comprising a bottom portion and a top portion detachably connected therewith, the top portion being inwardly contracted at the top thereof so as to form a central opening to receive the bottom portion of the neck of the siphon, said top portion being also provided in one side thereof with a radial slot or opening which communicates with the said central opening and the bottom portion of the casing being also provided adjacent to the bottom thereof with springs adapted to enter an annular groove in the bottom part of the siphon.

3. A bottle or similar vessel provided at the bottom with a deep annular groove, and a casing into which said bottle or vessel may be inserted, said casing being provided at the bottom thereof with a spring or springs adapted to enter said groove.

In testimony that I claim the foregoing as my invention I have signed my name in presence of the subscribing witnesses this 15 day of March, 1907.

LOUIS P. NASH.

Witnesses:
 C. E. MULREANY,
 A. WORDEN GIBBS.